United States Patent
Salamat et al.

(10) Patent No.: US 9,985,713 B2
(45) Date of Patent: May 29, 2018

(54) APPARATUS AND METHOD FOR GENERATING BOUNDARIES OF SATELLITE COVERAGE BEAMS

(71) Applicant: Hughes Network Systems, LLC, Germantown, MD (US)

(72) Inventors: Bahman Salamat, Germantown, MD (US); Murali Regunathan, Germantown, MD (US); David A. Roos, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 307 days.

(21) Appl. No.: 14/794,948

(22) Filed: Jul. 9, 2015

(65) Prior Publication Data

US 2017/0012688 A1    Jan. 12, 2017

(51) Int. Cl.
*H04B 7/14* (2006.01)
*H04W 16/18* (2009.01)
*H04B 7/204* (2006.01)

(52) U.S. Cl.
CPC ............. *H04B 7/14* (2013.01); *H04B 7/2041* (2013.01); *H04W 16/18* (2013.01)

(58) Field of Classification Search
None
See application file for complete search history.

(56) References Cited

U.S. PATENT DOCUMENTS

| | | | | |
|---|---|---|---|---|
| 6,491,257 B1* | 12/2002 | Emmons, Jr. | ........ | B64G 1/1085 244/158.6 |
| 2003/0003883 A1* | 1/2003 | Wallace | ................... | H01Q 3/26 455/115.1 |
| 2011/0159891 A1* | 6/2011 | Segall | ................... | H04W 64/00 455/456.3 |
| 2011/0267229 A1* | 11/2011 | Gayrard | ................ | G01S 13/878 342/357.31 |
| 2012/0075440 A1* | 3/2012 | Ahuja | ..................... | G06T 7/136 348/61 |
| 2014/0003365 A1* | 1/2014 | Carey | ................. | H04W 72/046 370/329 |
| 2016/0156409 A1* | 6/2016 | Chang | .................. | H04B 7/2041 370/315 |

* cited by examiner

*Primary Examiner* — Xavier Szewai Wong
(74) *Attorney, Agent, or Firm* — Nath, Goldberg & Meyer; Leonid D. Thenor

(57) ABSTRACT

An apparatus for defining and generating boundaries of satellite coverage. The apparatus includes a processor that is configured to select a plurality of beam points, from a set of points on a coordinate system, to be included within a beam definition, and determine a number of ellipses capable of enclosing the selected beam points while excluding all remaining points of the set of points. The processor then assigns the selected beam points to a corresponding ellipse, and optimizes geometric information for each ellipse to enclose the beam points assigned thereto. A coverage beam is then defined based on a contour resulting from the combined shape of all the ellipses using the optimized geometric information.

26 Claims, 12 Drawing Sheets

APPARATUS AND METHOD FOR GENERATING BOUNDARIES OF SATELLITE COVERAGE BEAMS

BACKGROUND INFORMATION

Developments in mobile communications have enabled consumers to remain connected without the need to have a wired connection. For example, satellite communication systems allow consumers to access voice and data services from virtually any global location. Such accessibility can be beneficial for consumers who are located in, or must travel to, areas that cannot be serviced by normal communication systems.

Satellite communication systems utilize coverage beams for servicing specific geographical regions of a coverage area. Thus, multiple coverage beams can be combined in order to service the entire coverage area. Coverage beams are defined based on various factors including, density of user terminals, available frequency, etc. For example, five coverage beams may be sufficient to service a sparsely populated area, whereas a densely populated area (i.e., the north-east region including New York City, Boston, and Washington D.C.) may require a greater number of coverage beams. User terminals within the coverage area optimize communication by selecting appropriate configuration settings (e.g., up/downlink frequencies, power, etc.) based on their assigned coverage beams.

Conventional spot beam satellite communication systems typically generate coverage beams in the form of circles that are arranged to physically overlay the geographic coverage area. Sometimes, however, portions of the coverage map are not optimally served by its assigned beam. For example, a link budget analysis can suggest that a particular section (or points) of the coverage map would be best assigned to a particular coverage beam. The circular shape and overlay of the coverage beams, however, may result in the particular section being assigned to an adjacent coverage beam. Such assignments can result in various communication difficulties between the satellite and user terminals within the particular region. Under extreme conditions, it is possible to have complete communication failure. It is therefore necessary to properly define the shape of coverage beams in order to optimize communication and maintain a desired level of service for consumers within the entire coverage area.

BRIEF SUMMARY

An apparatus and method are described for defining and generating boundaries of satellite coverage beams. According to an embodiment, the apparatus includes a processor configured to: select a plurality of beam points, from a set of points on a coordinate system, to be included within a beam definition; determine a number of ellipses capable of enclosing the selected beam points while excluding all remaining points from the set of points; assign the selected beam points to a corresponding ellipse; optimize geometric information for each ellipse to enclose the selected beam points assigned thereto; and define a coverage beam based on a contour resulting from a combined shape of all the ellipses using the optimized geometric information.

According to another embodiment, the method includes selecting a plurality of beam points, from a set of points on a coordinate system, to be included within a beam definition; determining a number of ellipses capable of enclosing the selected beam points while excluding all remaining points from the set of points; assigning the selected beam points to a corresponding ellipse; optimizing geometric information for each ellipse to enclose the selected beam points assigned thereto; and defining a coverage beam based on a contour resulting from a combined shape of all the ellipses using the optimized geometric information.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus and method for defining and generating boundaries of satellite coverage beams are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
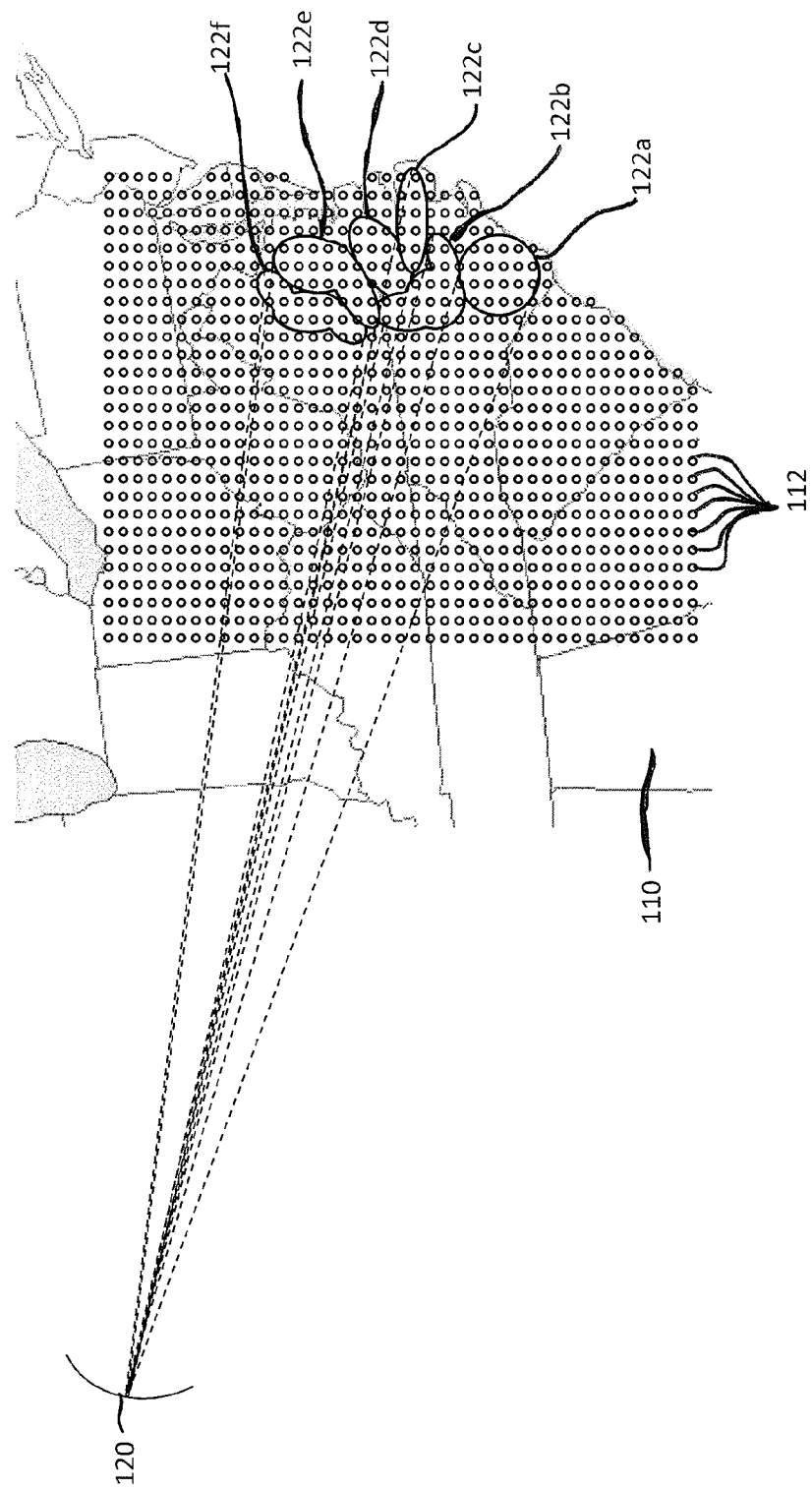
FIG. 1 is a system diagram illustrating coverage beams of a geographic region, according to one embodiment.

FIG. 1 is illustrates a system of coverage beams formed over a geographic region, according to an exemplary embodiment. The system includes a map 110 of a coverage region and a communication satellite 120. As illustrated in FIG. 1, the map 110 contains a plurality of coordinate points 112 that are arranged in the form of a coordinate system. For purposes of illustration, the coordinate points 112 are only shown on a portion of the map 110. Furthermore, the size and spacing between coordinate points 112 has been exaggerated for purposes of explaining various features of the exemplary embodiment. According to the illustrated embodiment, the coordinate points 112 are arranged in a two-dimensional pattern that can, for example, correspond to an X-axis and a Y-axis. Thus, the location of each coordinate point 112 can be uniquely determined based on the two-dimensional coordinates.

FIG. 1 further illustrates a plurality of coverage beams 122a-122f (collectively 122) which service specific regions of the map 110 in accordance with coverage provided by the communication satellite 120. Each coverage beam 122 encloses a plurality of coordinate points 112 that can be assigned thereto based on, for example, a link budget analysis of its physical location. In order to improve and/or optimize communication between user terminals (not shown) and the communication satellite 120, various parameters of the user terminal must be properly configured. For example, depending on the available bandwidth and level of frequency reuse, adjacent coverage beams 112 may utilize frequencies that are different from each other. Thus, a user terminal belonging to a particular coverage beam would need to adjust uplink and downlink frequencies for proper communication. Furthermore, it may be necessary to adjust the transmit power of the user terminal based on its assigned coverage beam.

As illustrated in FIG. 1, various embodiments provide for different shapes for individual coverage beams 122. As will be discussed in greater detail below, such embodiments utilize one or more geometric shapes, such as an ellipse, in order to generate a complex contour for the individual coverage beams 122. For example, coverage beam 122a is in the form of a circle similar to those used in conventional coverage beams. Coverage beam 122b, however, is constructed using a circle and two ellipses. Coverage beams 122c and 122d are each in the form of an ellipse. Coverage beam 122e is constructed using two ellipses, whereas coverage beam 122f is constructed using 3 ellipses. It should be noted that the coverage beams 122 required for a region can have different combinations of shapes as illustrated in FIG. 1, or a plurality of the same type of shape (i.e., all circles or all ellipses). Furthermore, a compound shape (e.g., constructed using 3 ellipses) can be used to represent each coverage beam 122. The coverage beams 122 illustrated in FIG. 1, therefore, can facilitate improved communication by including coordinate points 112 that can optimize communication between user terminals within the coverage beam 122 and the communication satellite 120.

Figure 2:
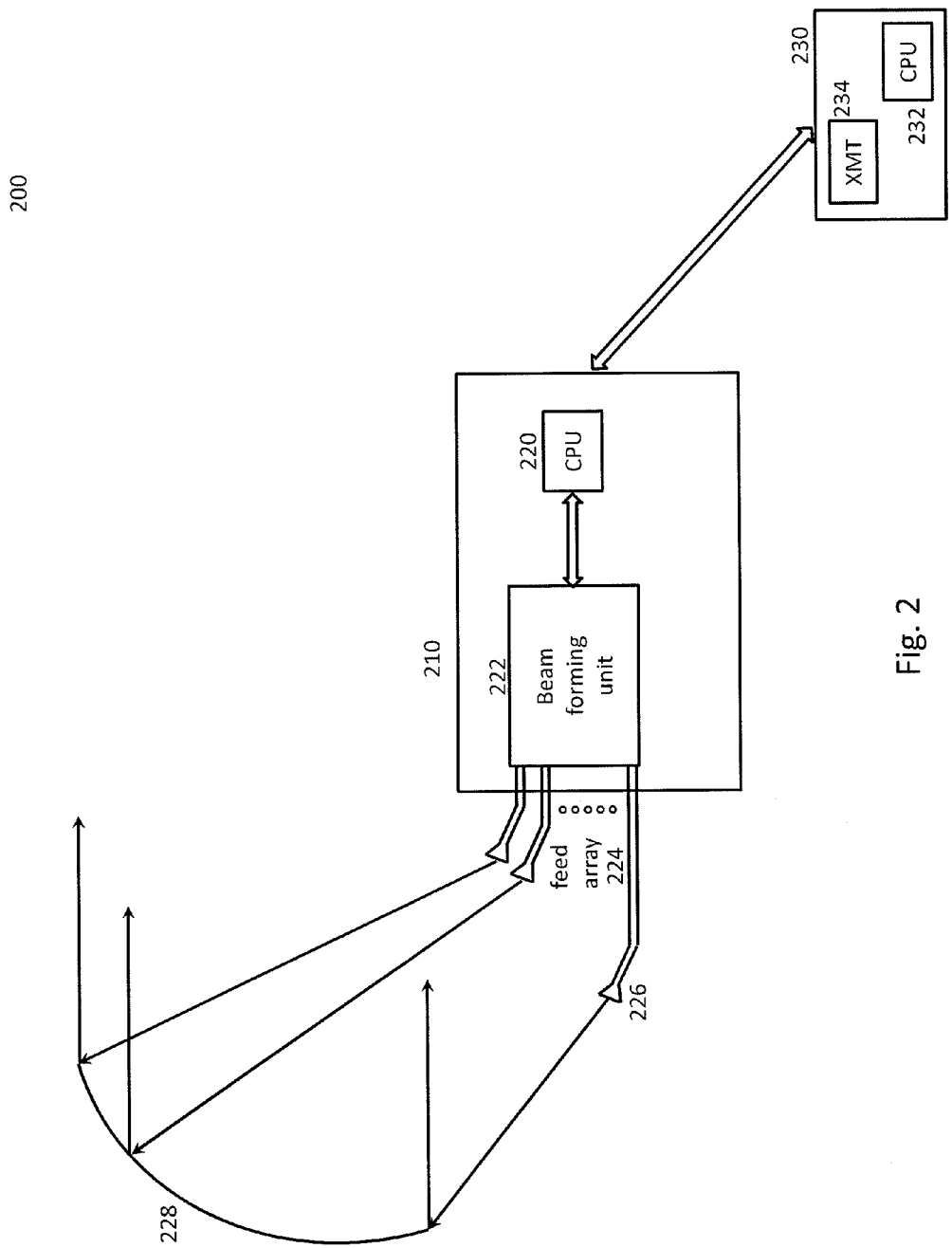
FIG. 2 is a diagram of a system for generating coverage beams such as those in FIG. 1, according to at least one embodiment.

FIG. 2 illustrates a system 200 for generating coverage beams in accordance with at least one embodiment. The system 200 can include at least one transmitter 210, which is a part of the communication satellite 120. According to various embodiments, the transmitter 210 can function to transmit and receive signals to/from various user terminals. The transmitter 210 can further include a CPU 220 and a beam forming unit 222. While FIG. 2 illustrates a single CPU within the transmitter 210, it should be noted that various embodiments can provide for multiple CPUs. Furthermore, various controllers or other devices can be configured to perform the necessary tasks. Various embodiments further allow the CPU 220 and beam forming unit 222 to be subunits of the communication satellite 120 rather than the transmitter 210.

The ellipse parameters (i.e., geometric information) that define the boundaries of each coverage beam of the satellite system, according to an embodiment, can be downloaded to each user terminal. According to other embodiments, an installer or other authorized personnel manually enters the location of the user terminal during the installation process. Each user terminal, knowing its own location, can then calculate which particular ellipse (also referred to as a virtual beam) encompasses its position. This ellipse, or virtual beam, defines a part of or the complete coverage beam. This information allows the user terminal to determine which coverage beam should be used for transmitting and/or receiving. If there is an overlapping area between two coverage beams, the user terminal calculates a weighted normalized distance from the center of the two coverage beams and chooses the coverage beam whose weighted normalized distance is lower.

According to at least one embodiment, the CPU 220 can be used to perform a link budget analysis in order to determine which coordinate points 112 should be assigned to each coverage beam 122. The link budget analysis can account for various factors, such as an availability number for each coordinate point 112 relative to its assigned coverage beam 122. Thus, the coordinate points 112 can be assigned to coverage beams 122 which best optimize communications between user terminals within the coverage beams 122 and the communication satellite 120. The CPU 220 further performs all the necessary calculations to determine the shapes of all the coverage beams 122, and obtains the necessary parameters (or geometric information) for the various geometric shapes used to define the coverage beams 122.

According to one or more embodiments, the coverage beams 122 can also be defined at a ground station 230 which subsequently transmits all necessary information to the communication satellite 120. For example, the ground station 230 can include one or more CPUs 232 which perform the link budget analysis on the coordinate points 112, and determine the shape of each coverage beam 122. According to various embodiments, the link budget analysis can be performed based, in part, on performance characteristics of the satellite. The ground station 230 can further include a transmitter 234 for transmitting the information necessary for reproducing the geometric shapes which define coverage beams 122 to the communication satellite 120. According to at least one embodiment, one or more ellipses can be used to define the contour of each coverage beam 122. Accordingly, information necessary for reproducing each individual ellipse would be transmitted to the communication satellite 120. Such information can include, for example, the major radius, minor radius, center location, focal points, tilt angle, etc.

The information for generating the shape of the coverage beam 122 is then supplied to a beam forming unit 222 for appropriate processing. As illustrated in FIG. 2, the beam forming unit 222 can interact with a feed array 224 which generates the coverage beams 122 for the communication satellite 120. Depending on the specific embodiment or communication satellite 120, multiple beam forming units 222 and feed arrays 224 can be provided. As illustrated in FIG. 2, the feed array 224 can include a plurality of radiating elements 210 which generate the communication signals within the defined coverage beams 122. The radiating elements 210 direct their output signal to a parabolic reflector 228 which subsequently directs the signal to precise geographic positions on the coverage map 110.

Figure 3:
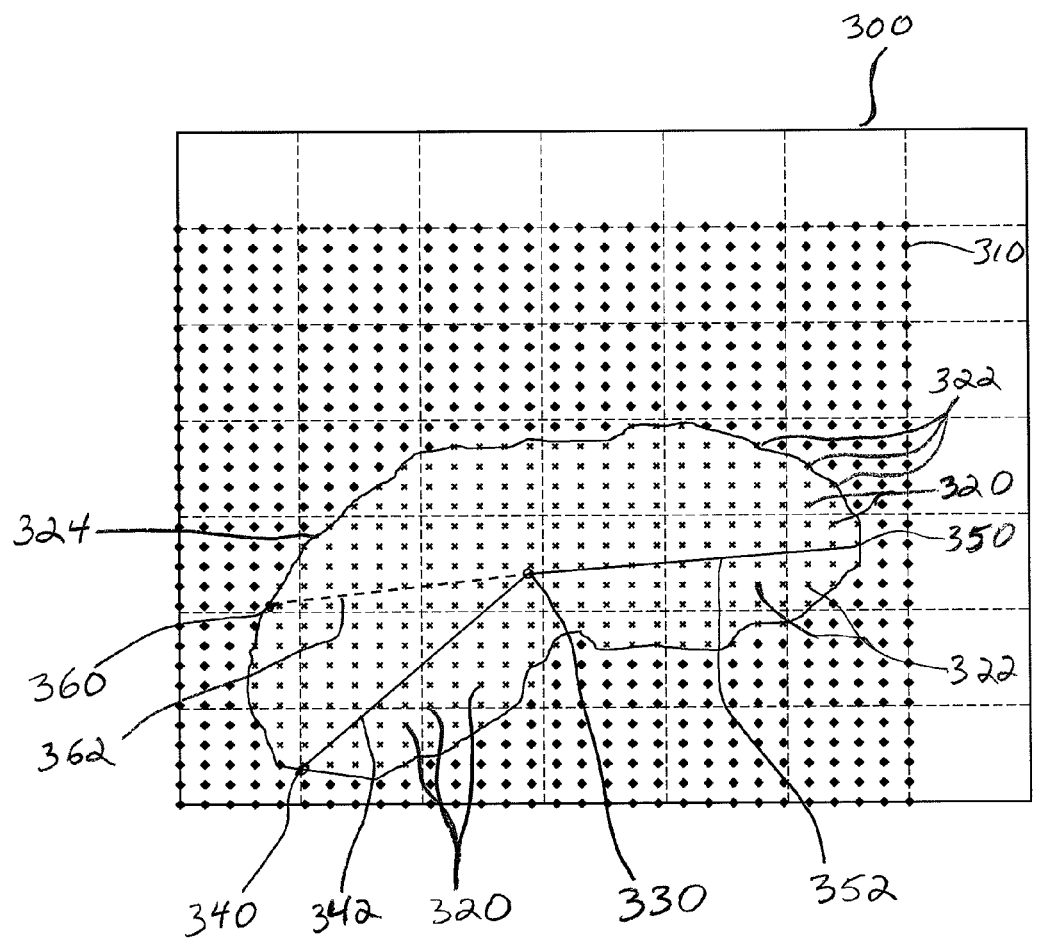
FIG. 3 is a diagram illustrating the location of points for a desired coverage beam, according to one embodiment.

FIG. 3 illustrates a coverage map 300 containing a plurality of coordinate points 310, in accordance with at least one embodiment. The coverage map 300 further includes a plurality of selected beam points 320 that have been designated for inclusion in a particular coverage beam. As previously discussed, various embodiments can define the coverage beam base on a predetermined number of selected beam points 320. Each selected beam point 320 can correspond, for example, to a coordinate point 310 which has been subject to a link budget analysis and assigned to the particular beam. As used herein, the terms "coordinate point", "beam point", and "point" all refer to points in the coverage map and may be used interchangeably. The remaining coordinate points 310 will therefore be excluded. According to various embodiments, such coordinate points 310 can be assigned to different coverage beams.

The coordinate location of each selected beam point 320 is then obtained, and a centroid 330 is calculated for the set of selected beam points 320. According to an embodiment, the centroid of all the selected beam points 320 can be obtained by taking the average in both X and Y axes. Thus, only the selected beam points 320 which have been selected for assignment to the coverage beam would be included in such calculations. The distance between each selected beam point 320 and the centroid 330 is then determined. Furthermore, according to at least one embodiment, the angle of each selected beam point 320 relative to the location of the centroid 330 is also determined. According to further embodiments, only the angles corresponding to edge points 322 of the beam contour are determined. The edge points 322 correspond to selected beam points which are furthest from the centroid 330. As illustrated in FIG. 3, the edge points 322 can be sequentially connected to adjacent edge points 322 in order to define a contour 324 for the selected beam points 320.

Figure 4:
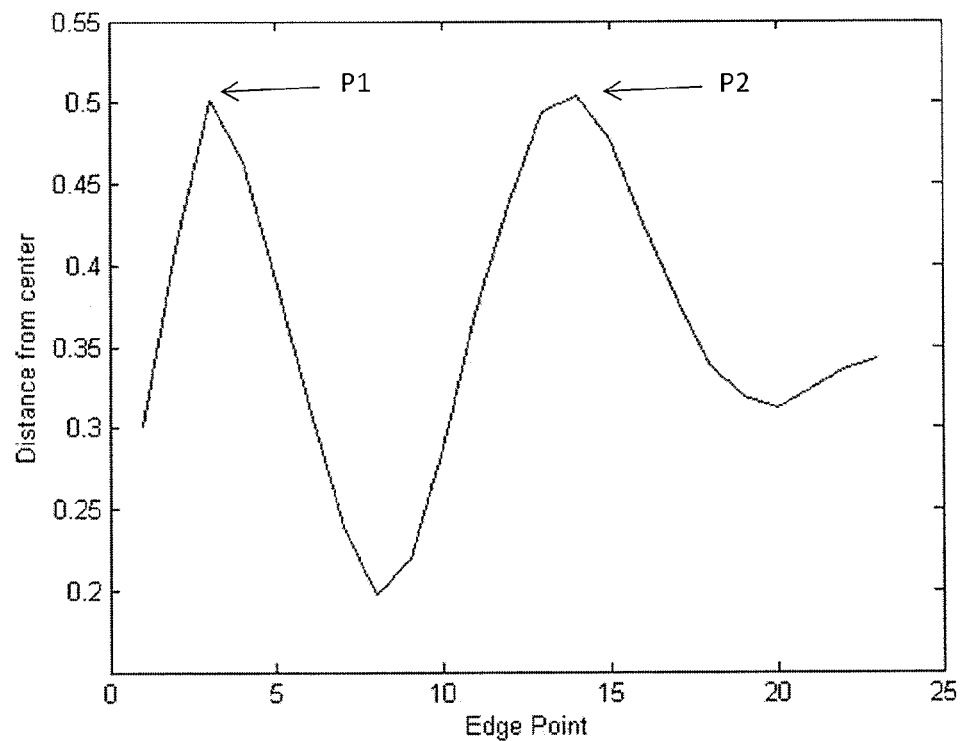
FIG. 4 is a diagram illustrating determination of a number of shapes for constructing the coverage beam, according to at least one embodiment.

According to the embodiment illustrated in FIG. 3, one or more ellipses might be required as the geometric shapes for defining the coverage beam and excluding the other points. The number of ellipses can be determined, in part, by the number of local maxima that are present in the function $f=\text{dist}(\text{angle})$. The function $f$ denotes the distance of each of the edge points from the centroid, as a function of the angle of the edge point from the centroid. FIG. 4 illustrates a plot of the function $f$ for the case of the edge points from FIG. 3. Two local maxima P1 and P2 are found, and can be used in part to determine the number of ellipses required. As used herein, each point corresponding to these local maxima is referred to as a max distance point (MDP).

It should be noted, however, that the number of ellipses used to generate the coverage beam can be greater than, or less than, the number of MDPs depending on the specific system requirements. For example, four MDPs can be identified for a particular set of selected beam points. However, various factors such as, computational cost, relative improvement to the link budget, etc., can result in the use of only 3 or 2 ellipse for generating the coverage beam. Furthermore, it is also possible that 5 or 6 ellipses can be used despite identification of only two MDPs. Thus, the number of MDPs only represents one manner of estimating the number of required ellipses, should not be construed as placing any type of limit and/or constraint on the number of ellipses for generating the shape of the coverage beam.

According to one or more embodiments, it is possible to eliminate certain edge points as MDPs based on their locations. For example, depending on the specific location of the centroid, edge points that are positioned relatively opposite to each other, their angles from the centroid being 180 (±10°) apart, can appear as MDPs. Such points, however, may actually fall within the coverage area of a single ellipse. According to at least one embodiment, if two edge points are approximately opposite to each other, then the closest edge point to the centroid is excluded.

Figure 5A:
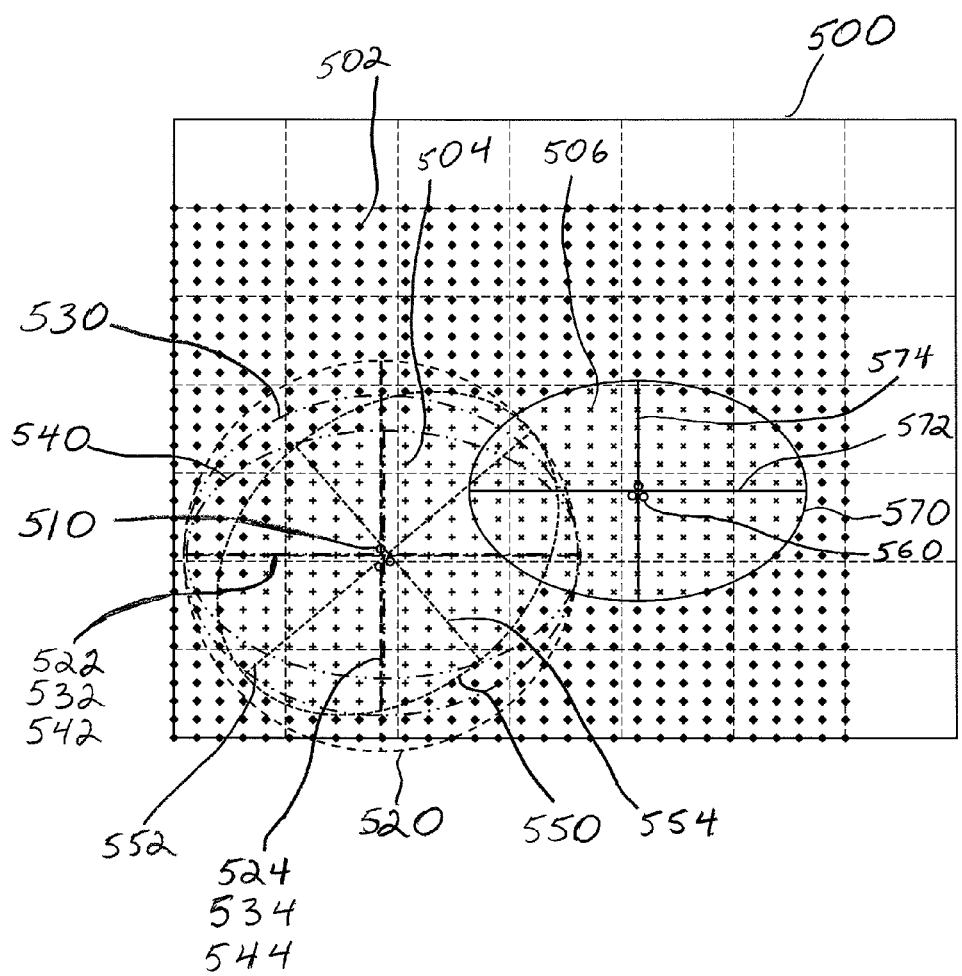
FIG. 5A is a diagram illustrating construction of two ellipses for enclosing selected beam points of a coverage beam, according to one or more embodiments.

FIG. 5A illustrates the manner in which the shape of the coverage beam is constructed using two ellipses, according to one or more embodiments. FIG. 5A illustrates a coordinate map 500 that contains a plurality of coordinate points 502. As previously discussed, the coordinate points 502 can be arranged in the form of an X-Y axis. Furthermore, according to various embodiments, the coordinate map 500 can configured such that the location of coordinate points 502 can be determined based, at least in part, on coordinate data obtained from global positioning satellites (GPS). Accordingly, the actual X-Y location of any coordinate point can be converted to GPS latitude and longitude values.

FIG. 5A further illustrates an embodiment wherein 2 ellipses have been selected to enclose all of the selected beam points. As will be discussed in greater detail below, the selected beam points have been assigned to individual ellipses. For example, selected beam points 504 have been assigned to a first ellipse 520 and selected beam points 506 have been assigned to a second ellipse 570. According to one or more embodiments, a center is estimated for each ellipse before the points are assigned to the corresponding ellipses. For example, a center 510 has been estimated for the first ellipse 520. The center 510 can be estimated using various mathematical properties of an ellipse. For example, consider two points (P and Q) which lie on an ellipse. If tangents to the ellipse at points P and Q are not parallel to each other, they will intersect at a point R. A line passing through the point of intersection R and the midpoint between P and Q will also pass through the center of the ellipse. A pair of edge points P and Q gives us one line that passes through the center. Two such lines will intersect at the center of the ellipse. Accordingly, two pairs of edge points (P1, Q1) (P2, Q2), and the tangents through them will give us two such lines that can be used in a similar manner to estimate the center of the ellipse.

According to at least one embodiment, multiple sets of 2 pairs of edge points can be used to improve the estimate for the center of the ellipse. For example, 3 sets of 2 pairs of edge points can be selected to obtain 3 different estimates for the center 510. The coordinates of these three estimated centers 510 can then be averaged in order to obtain a single location for the estimated center. According to one or more embodiments, points used for estimating the ellipse center can be selected based on their proximity to the MDP for that particular ellipse. For example, edge points along a contour arc within a predetermined angle from the MDP for that ellipse (e.g., ±30°) can be selected. The term "contour arc" refers to a contour drawn by connecting adjacent edge points as described with respect to FIG. 3. Since the contour is not an actual ellipse, an arc of ±30° would be an estimate which approximates the position of the edge points. Once the center for each ellipse is found using the procedure above, the selected beam points that are to be included in the corresponding ellipses are assigned. According to an embodiment, the distance of each of these points from the center of the ellipses is calculated. A comparison of the distance from each center is done in order to identify the shortest distance. The point can subsequently be assigned to the ellipse having the shortest distance.

According to at least one embodiment, the initial parameters (or geometric information) for constructing the first ellipse 520 can be based only on the distance of the corresponding MDP from the centroid of the set of selected beam points. This distance can be utilized as the both the major radius and the minor radius. Thus, the first ellipse 520 is initially constructed as a circle. As illustrated in FIG. 5A, the initial parameters (or geometric information) for drawing the first ellipse 520 further establish the major radius 522 as substantially parallel to the horizontal axis, while the minor radius 524 is substantially parallel to the vertical axis (i.e. perpendicular to the major radius). Although FIG. 5A illustrates the first ellipse 520 being constructed as a circle, it should be noted that other embodiments do not require construction as a circle. Rather, the major radius 522 can be selected such that it differs from the minor radius 524, thereby resulting in a first ellipse which resembles a conventional ellipse. Additionally, the major radius 522 and the minor radius 524 can be independently selected and/or estimated. Thus, the configuration whereby a circular first ellipse 520 is constructed should only be viewed as exemplary, and in no way limiting.

In order to optimize the parameters of the first ellipse 520 such that its shape encloses only the selected beam points 504 while also excluding any coordinate points 502, a first adjustment is made to the ellipse parameters. According to the illustrated embodiment, the first adjustment corresponds to a reduction of the minor radius 524 of the first ellipse 520. This results in a transformation from a circle (i.e., a special type of ellipse) to a more conventional ellipse where the minor radius 532 is less than the major radius 534. The resulting form of the first adjusted ellipse is identified by reference numeral 530. Since no other parameters have been adjusted, the major radius 532 is still aligned with the major radius of the initial estimated ellipse 522. Similarly, the minor radius 534 after the first adjustment is still aligned with the minor radius 524 of the initial estimated ellipse 520. A second adjustment is then performed to the parameters of ellipse 530. The second adjustment is again performed such that only the minor radius is reduced. This results in a second adjusted ellipse 540. As can be seen in FIG. 5, the major radius of the estimated ellipse 520, the major radius of the first adjusted ellipse 530 and the major radius of the second adjusted ellipse 540 are all aligned with each other. Similarly, the minor radii (524, 534, 544) are also aligned with each other for all three ellipses (520, 530, 540).

FIG. 5A further illustrates a third adjustment being made to ellipse 540. Unlike the prior adjustments, the third adjustment changes the tilt angle of the major axis. This results in a rotation of the ellipse about its center. The resulting third adjusted ellipse 550 now includes a major radius 552 and a minor radius 554 which no longer coincide with the radii of the previously adjusted ellipses (i.e., the estimated first ellipse 520, first adjusted ellipse 530, and second adjusted ellipse 540). By adjusting the tilt angle of the major axis, for example, the third adjusted ellipse 550 is better aligned to enclose the necessary beam points 504, while also excluding any coordinate points 502.

FIG. 5A further shows the second of the two ellipses 570 after its parameters have been optimized to enclose the selected beam points 506, while also excluding any coordinate points 502. Similar to the first ellipse, the center is estimated several times in order to obtain multiple estimated centers 560. The estimated centers 560 are then averaged in order to obtain the final center point from which the ellipse 570 will be constructed. The second ellipse 570 further includes a major radius 572 that is substantially parallel to the horizontal axis and a minor radius 574 that is substantially parallel to the vertical axis. According to at least one embodiment, each ellipse can be independently optimized such that its size and orientation results in a reduced area for enclosing all of the required beam points, while excluding all other points. As will be discussed in greater details below, the final parameters of the two ellipses (550, 570) can be utilized in generating the coverage beam contour. Accordingly, it becomes possible to generate a coverage beam having a complex contour capable of enclosing all of the necessary beam points to optimize communication between user terminals and the communications satellite.

According to at least one embodiment, the initial parameters for the first ellipse 520 can be estimated using the selected beam points 504 that are assigned to the first ellipse 520. First, a centroid of all the selected beam points 504 is determined by taking an average of the coordinate values along both X and Y axes. Next, a distance of all the beam points 504 from the centroid and the angle from the centroid is calculated. A major radius can be estimated as the maximum distance of all the beam points from the centroid. The beam point associated with the maximum distance can be designated as P. A minor radius can be estimated as the maximum distance among all the beam points that lie in a direction perpendicular to the major axis from the centroid. Once the major and minor radii have been estimated, an ellipse boundary is drawn. The initial ellipse boundary thus formed represents a conventional ellipse (i.e., Rmaj>Rmin), rather than a special ellipse such as a circle (i.e., Rmaj=Rmin), as in FIG. 5A. Various parameters of the ellipse can be adjusted, as previously discussed, in order to achieve a contour which encloses the selected beam points 504, while also excluding any coordinate points 502.

While FIG. 5A illustrates the first ellipse being optimized by decreasing the values of the major and minor radii, it should be noted that other embodiments can increase the values of the major and minor radii. For example, the first ellipse can be initially estimated such that it includes only beam points assigned thereto, but not the entire set of assigned beam points. Thus, some of the assigned beam points would be outside the first ellipse together with the coordinate points. Parameters of the first ellipse, such as the major and minor radii, would be increased in order to enclose the beam points that were initially outside the ellipse. The ellipse parameters could be optimized until all assigned beam points are enclosed by the ellipse, while excluding any coordinate (or unassigned) points.

Depending on various factors, such as the position of the beam points, it may be difficult to exclude the coordinate points through adjustment of only the major and minor radii. According to various embodiments, adjustments can be made to additional parameters in order to obtain a desired shape. FIG. 5A illustrates, for example, a condition where a third adjustment changes the tilt angle of the major axis, thereby resulting in rotation of the ellipse about its center. Additional parameters can also be used to optimize the shape and/or orientation of the ellipse. An exemplary list of parameters includes: center coordinates, major radius, minor radius, tilt angle of a major axis, or translation of center about the centroid, etc. Additionally, any combination of such parameters can be used in order to obtain a desired shape which includes only the beam points, while excluding the coordinate points.

Figure 5B:
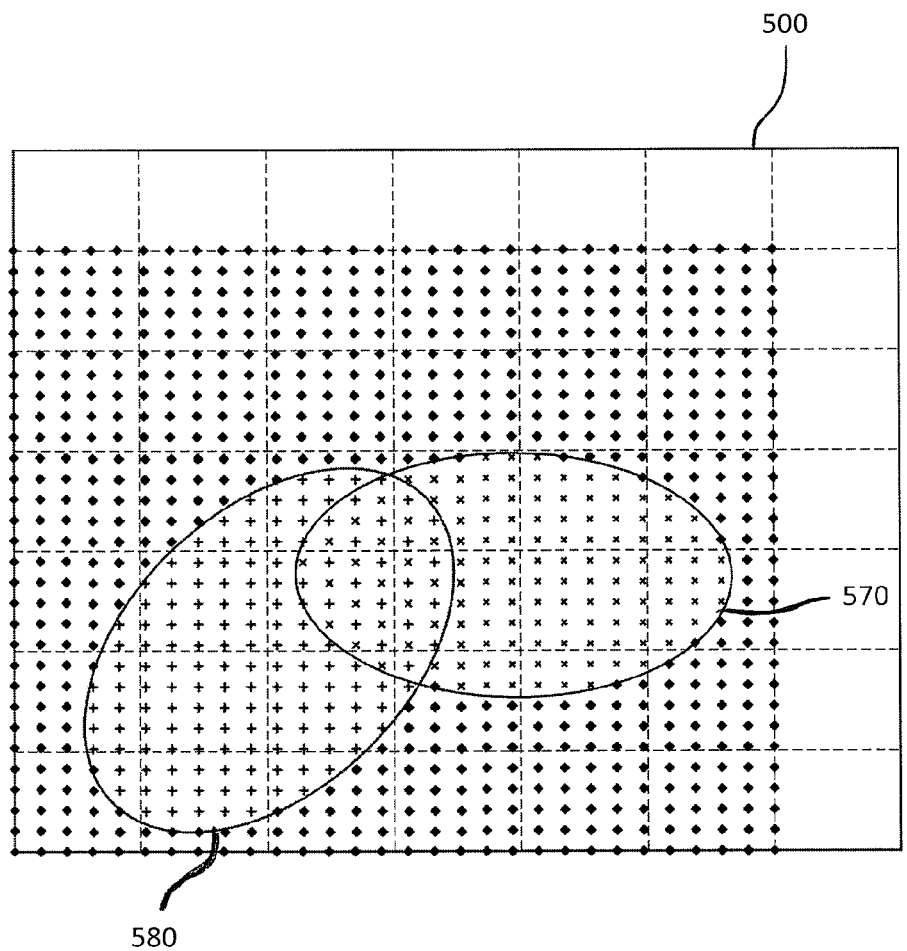
FIG. 5B is a diagram illustrating coverage of all selected beam points for the desired coverage beam using two ellipses, according to one or more embodiments.

FIG. 5B illustrates the coverage map 500 with all selected beam points for the desired coverage beam enclosed using two ellipses, according to one or more embodiments. Ellipse 580 corresponds to a final form of the first ellipse shown in FIG. 5A. Thus, Ellipse 580 represents the minimum area required to enclose the selected beam points 504. It should be noted, however, that the minimum area can be further constrained by any tolerances for the particular system implementation. As previously discussed, such constraints can include computational cost, improvements in link budget, improvements in communication between user terminals and the communication satellite, etc. FIG. 5B also illustrates ellipse 570 (i.e., the second ellipse) which encloses the selected beam points 506. In order to properly enclose all of the selected beam points, the two ellipses are positioned such that a portion of ellipse 570 overlaps with a portion of ellipse 580.

Figure 5C:
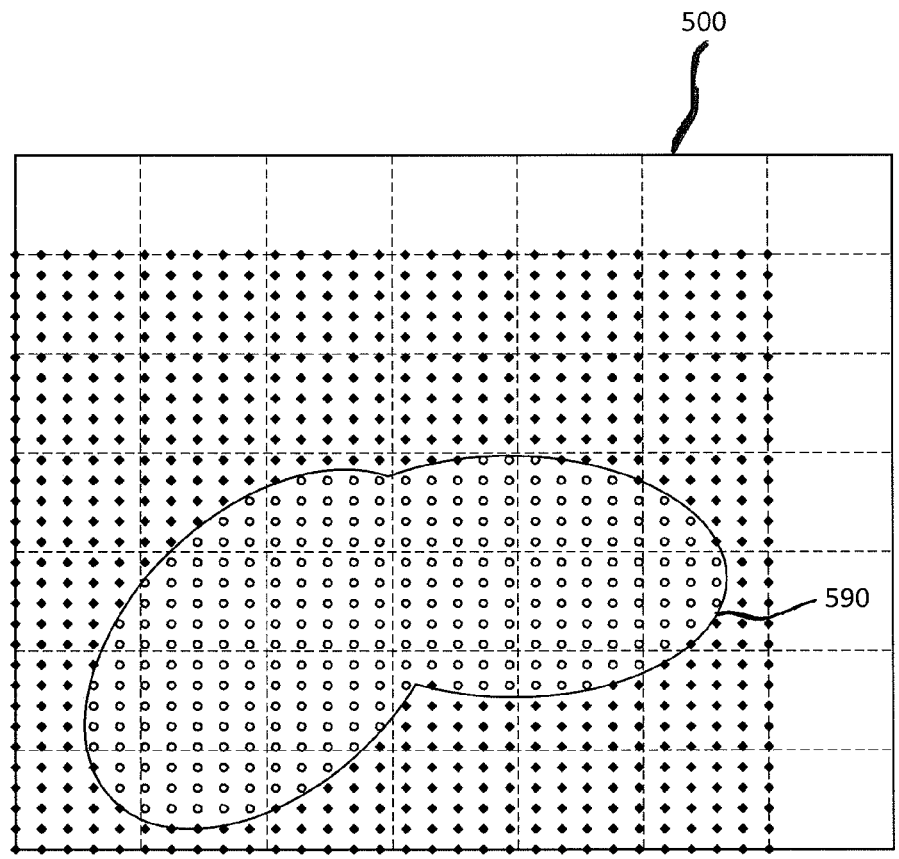
FIG. 5C is a diagram illustrating the required shape for the desired coverage beam, according to one embodiment.

In order to generate a continuous outline for the coverage beam, dimensions of the overlapping ellipse contours are not considered. More particularly, the combined contour resulting from ellipse 570 and ellipse 580 is utilized to define the shape of the coverage beam, while excluding the overlapping portion. This is illustrated in FIG. 5C which shows a continuous outline 590 resulting from the two ellipses for enclosing all of the selected beam points. According to at least one embodiment, the various parameters necessary to reconstruct the two ellipses are then supplied to the beam forming unit. Depending on the specific embodiment, such parameters can be supplied directly from the CPU in the communication satellite, or they may be transmitted from the ground station to the communication satellite. The beam forming unit 222 would subsequently analyze the received parameters and provide appropriate control signals to the feed array so that the radiating elements can shape the coverage beam in accordance with the outline 590 of the two ellipses.

Figure 6:
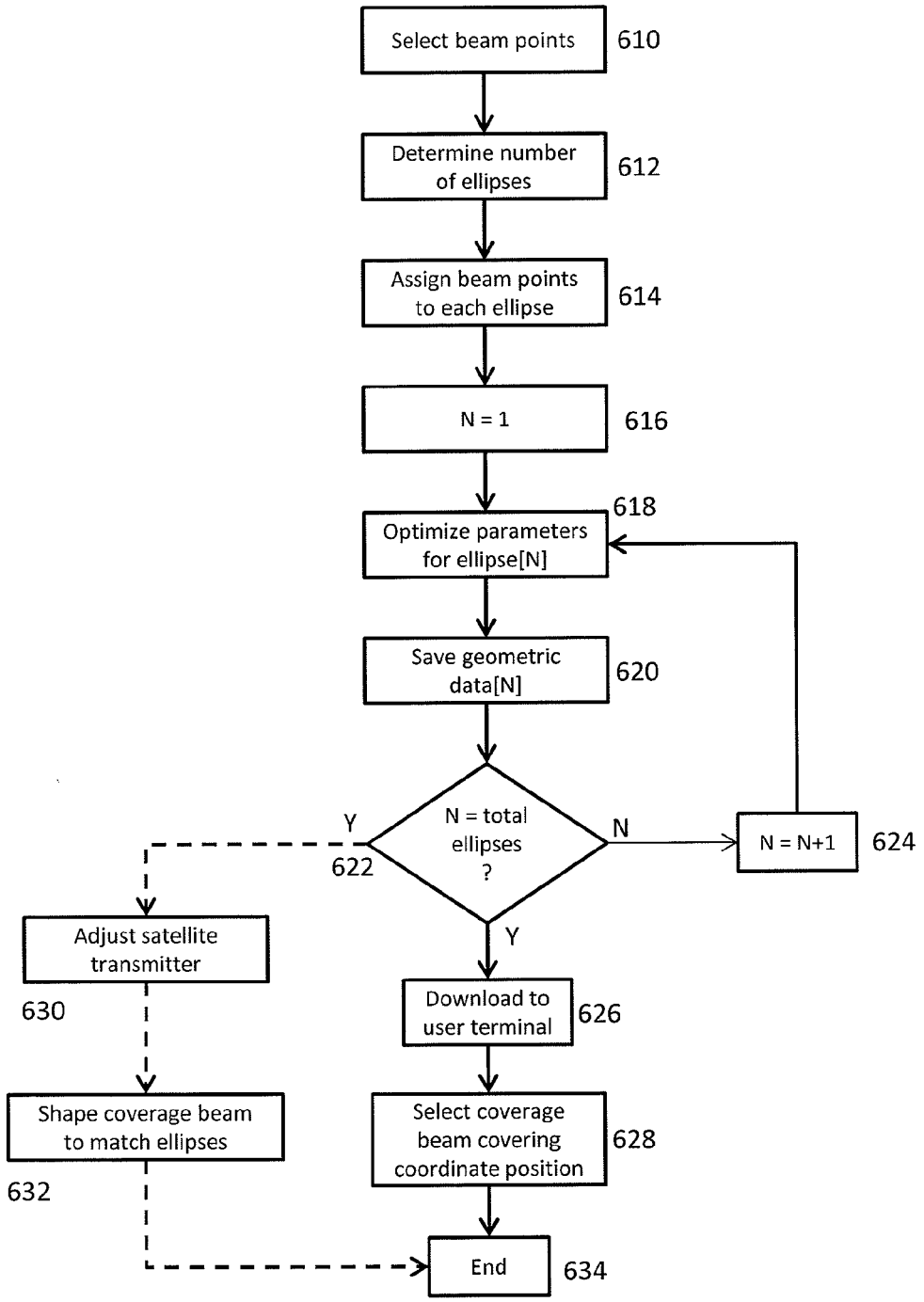
FIG. 6 is a flowchart of a process for generating coverage beams, according to at least one embodiment.

FIG. 6 is a flowchart illustrating the steps for generating coverage beans, in accordance with at least one embodiment. At 610, the beam points to be assigned to a particular coverage beam are selected. As previously discussed, this selection can be based, in part, on the results of various analyses to determine an arrangement of coverage beams that will improve and/or optimize communication between user terminals within each individual coverage beam and the communication satellite. Thus, a coordinate system can be established relative to the geographic coverage area. Specific beam points can then be selected for assignment to different coverage beams.

At 612, the number of ellipses necessary for defining the coverage beam is determined. According to at least one embodiment, the number of ellipses required can be determined based, at least in part, on the number of MDPs for the coverage beam and their location on the coordinate system. According to other embodiments, however, an operator can manually input the number of ellipses to be used for generating the coverage beam. According to still further embodiments, the operator can put a threshold limit for the number of ellipses. Thus, the selected beam points would be analyzed and the number of ellipses required to define the coverage beam would be determined as an estimate. If the estimated number of ellipses is less than or equal to the threshold limit input by the operator, then the estimated number would be assigned as the required number for the ellipses. If the estimated number of ellipses exceeds the threshold limit entered by the operator, then it would be discarded and the threshold limit would be used as the required number of ellipses.

At 614, beam points are assigned to each ellipse. As previously discussed, this can be accomplished by determining the center of each ellipse and calculating the distance between each beam point and the different ellipse centers. A comparison of the distance from each center is done in order to identify the shortest distance. The point can subsequently be assigned to the ellipse having the shortest distance. For example, if three ellipses are used, then three distances (D1, D2, D3) would be calculated for each point relative to each ellipse center. The point would be assigned, for example, to the first ellipse if D1 is the shortest distance. Similarly, if D2 or D3 is the shortest distance, then the point would be respectively assigned to the second or third ellipse.

At 616, a counter is initialized. The counter is used as an index for identifying each specific ellipse. The maximum value of the counter, therefore, corresponds to the maximum number of ellipses that is set by the operator, based on the number of MDPs, etc. At 618, various parameters of ellipse [N] (i.e., ellipse1) are optimized. According to the disclosed embodiment, the parameters are optimized in order to determine, in part, the minimum area required per ellipse to enclose the necessary beam points, while excluding all other points. Once the parameters have been optimized, the geometric data for reconstructing the ellipse1 is saved at 620. Such geometric data can include values for one or more parameters such as major radius, minor radius, focal point locations, center location, etc.

At 622, a test is performed to determine whether the count (N) is equal to the total number of ellipses determined for enclosing all of the selected beam points. If the count has not reached the total number of ellipses, then it is incremented by one at 624. Control then returns to 618, where parameters of the next ellipse (i.e., ellipse2) are optimized. Alternatively, if it is determined that the count has reached the total number of required ellipses, then control passes to 626. This corresponds to the situation where parameters for all of the required ellipses have been optimized, and the geometric data for each ellipse has been saved.

According to the embodiment illustrated in FIG. 6, the user terminals can be configured to independently select an appropriate coverage beam. For example, once the parameters for all ellipses have been optimized (622), control passes to 626. The geometric data which has been saved for the ellipses is downloaded to the user terminal. Information identifying the coordinates of the user terminal is then be used to determine the user terminal's position relative to the coverage beams. According to various embodiments, the user terminal can be equipped with a GPS receiver capable of determining geographic coordinates for its physical location. Alternatively, the user terminal's location can be manually set by an operator or appropriate service personnel. At 628, the user terminal configures itself for transmission and reception within the coverage beam which encompasses its coordinate position. According to various embodiments, geometric data for all coverage beams can downloaded to each user terminal. Each user terminal would then assign itself to the appropriate coverage beam, for example, based on its physical location.

According to one or more embodiments, the geometric data for the ellipses can also be used by the communication satellite to generate appropriate coverage beams. For example, various adjustments can be made to the satellite transmitter at 630. According to such embodiments, the beam forming unit can determine the necessary parameters for supplying to the feed array in order to shape the coverage beam to enclose all of the selected beam points. The beam forming unit can, therefore, be configured to utilize the geometric data for each of the ellipses. As previously discussed, it is possible to obtain the geometric data from one or more CPUs within that the satellite, and/or from the ground station. In addition, various embodiments can allow for the use of appropriate conversion factors which can account for the distance between the communication satellite and the selected beam points while configuring the coverage beam. At 632, the coverage beam is shaped to match the combined contour of all the ellipses. Thus, the output of the individual radiating elements within the feed array can be controlled such that the necessary contour is achieved for the coverage beam. According to still further embodiments, it is possible to perform both options, thereby also downloading geometric data to the user terminals in addition to adjusting the satellite transmitter to shape the coverage beam to match the ellipses. The process and at 634.

Figure 7:
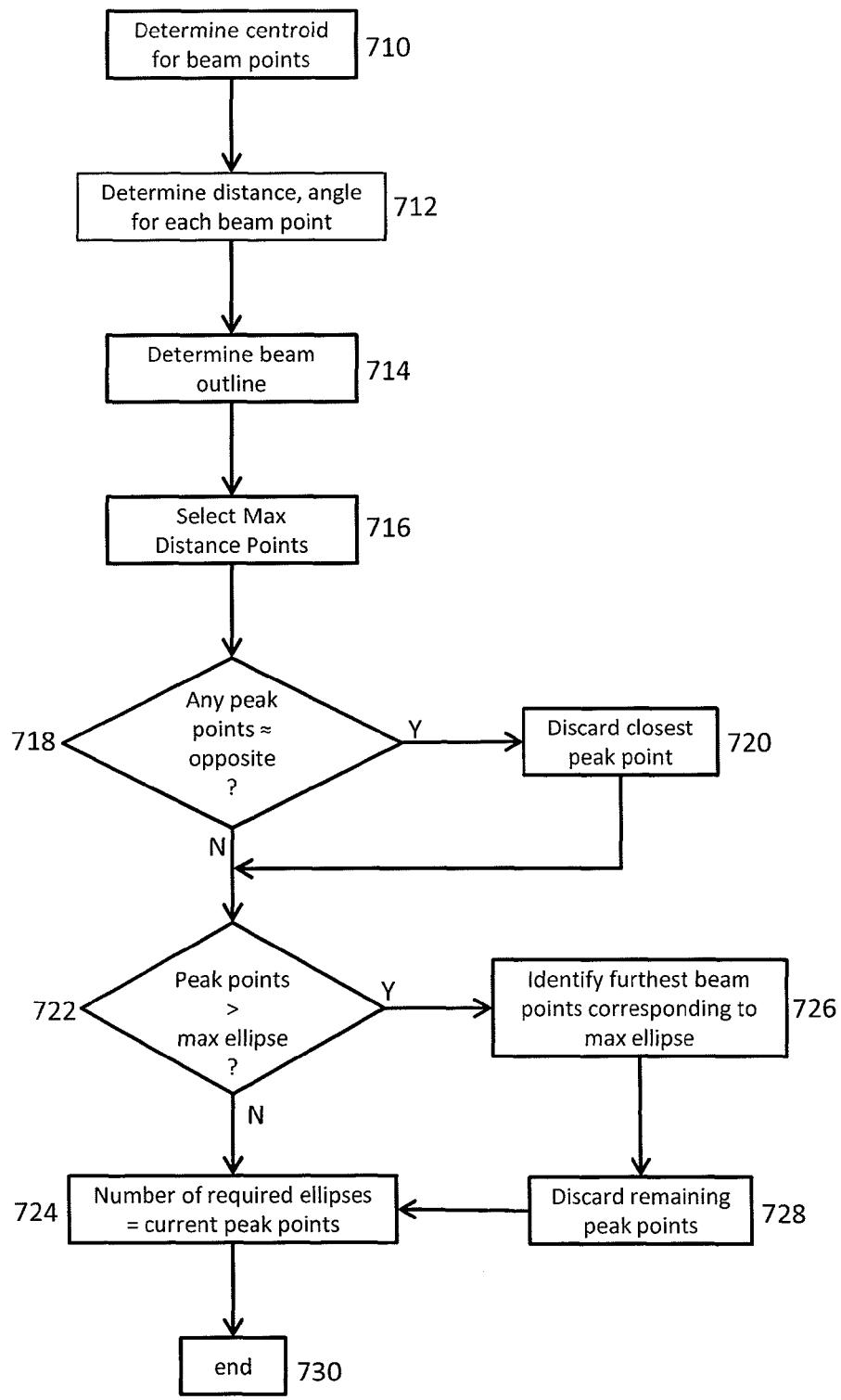
FIG. 7 is a flowchart of a process for determining the number of ellipses for the coverage beam, according to one embodiment.

FIG. 7 is a flowchart illustrating the steps performed to determine the number of ellipses necessary to enclose all of the selected beam points, in accordance with at least one embodiment. At 710, a centroid is determined for the set of selected beam points. As previously discussed, various embodiments allow the coordinate points to be configured as a two-dimensional coordinate system containing, for example, X-Y coordinate pairs. Furthermore, various embodiments can establish the coordinate system and point locations based on information obtained from GPS. Accordingly, once a set of points is selected for use as beam points, the coordinate of each individual beam point can be obtained in order to calculate a centroid for the entire set of beam points.

At 712, a distance and angle are determined for each beam point relative to the centroid. For example, if 50 beam points are selected for a particular coverage beam, a table can be constructed which contains 50 entries, corresponding to each of the 50 beam points. Each entry can further include a distance and angle from the centroid for that particular beam point. At 714, a beam outline is determined for the set of beam points. According to at least one embodiment, the beam outline can be constructed by identifying the furthest beam points from the centroid.

At 716, maximum distance points (MDP) are selected. According to an embodiment, the distance of each beam point from the centroid can be plotted in order to identify MDPs which correspond to points that are furthest from the centroid. According to another embodiment, the MDPs correspond to the number of local maxima that are present in the function $f=\text{dist(angle)}$. The function $f$ denotes the distance of each of the edge points from the centroid, as a function of the angle of the edge point from the centroid. At 718, the selected MDPs are further examined in order to determine whether any are approximately opposite to each other. According to one embodiment, the MDPs may be between 175° to 185° from each other in order to satisfy this criteria. According to other embodiments, the MDPs may be approximately 170° to 190° from each other in order to satisfy the criteria. According to still further embodiments, MDPs that are anywhere between 165° to 195° from each other can be considered as satisfying the criteria of being approximately opposite to each other. If two MDPs are determined to be approximately 180° from each other, for example, control passes to 720. The distance between each of the two MDPs and the centroid is then examined. The MDP that is determined to be closest to the centroid is discarded. Control then passes to 722. Alternatively, if it is determined at 718 that no MDPs are approximately 180° from each other, control also passes to 722.

According to one or more embodiments, a maximum number of ellipses can be set for defining the coverage beam. The maximum number of ellipses can be selected based on various criteria, including a balance between computational cost and link cost. Furthermore, the maximum number of ellipses can be entered by an operator, set in advance, or provided any time during the process for defining the coverage beam. At 722, it is determined whether the number of MDPs is greater than the value selected for the maximum number of ellipses. As previously discussed, various embodiments provide for determination of the required number of ellipses based only on the number of identified MDPs. The number of MDPs identified after the test at 718 would therefore correspond to the number of ellipses necessary to generate a contour which encloses all of the selected beam points. If the number of MDPs does not exceed the maximum value that has been set, control passes to 724 where the number of required ellipses is set equal to the current number of MDPs. If the number of MDPs identified is greater than the maximum number of ellipses that has been set, control passes to 726.

According to at least one embodiment, if the maximum number of ellipses has been set to a value of 5, a constraint is established to utilize no more than 5 ellipses for generating the contour of the coverage beam. If the total number of MDPs is 7, then the result of 722 would indicated that the number of MDPs exceeds the maximum number of ellipses. The 5 MDPs that are furthest from the centroid would be identified in order to satisfy the maximum criteria. At 728, the remaining MDPs that exceed the maximum threshold are discarded. Based on the previous example, the 2 MDPs that are closest to the centroid would be discarded. Control would then return to 724 where the number of required ellipses would be set equal to the current number of MDPs. The process would then and at 730.

Figure 8A:
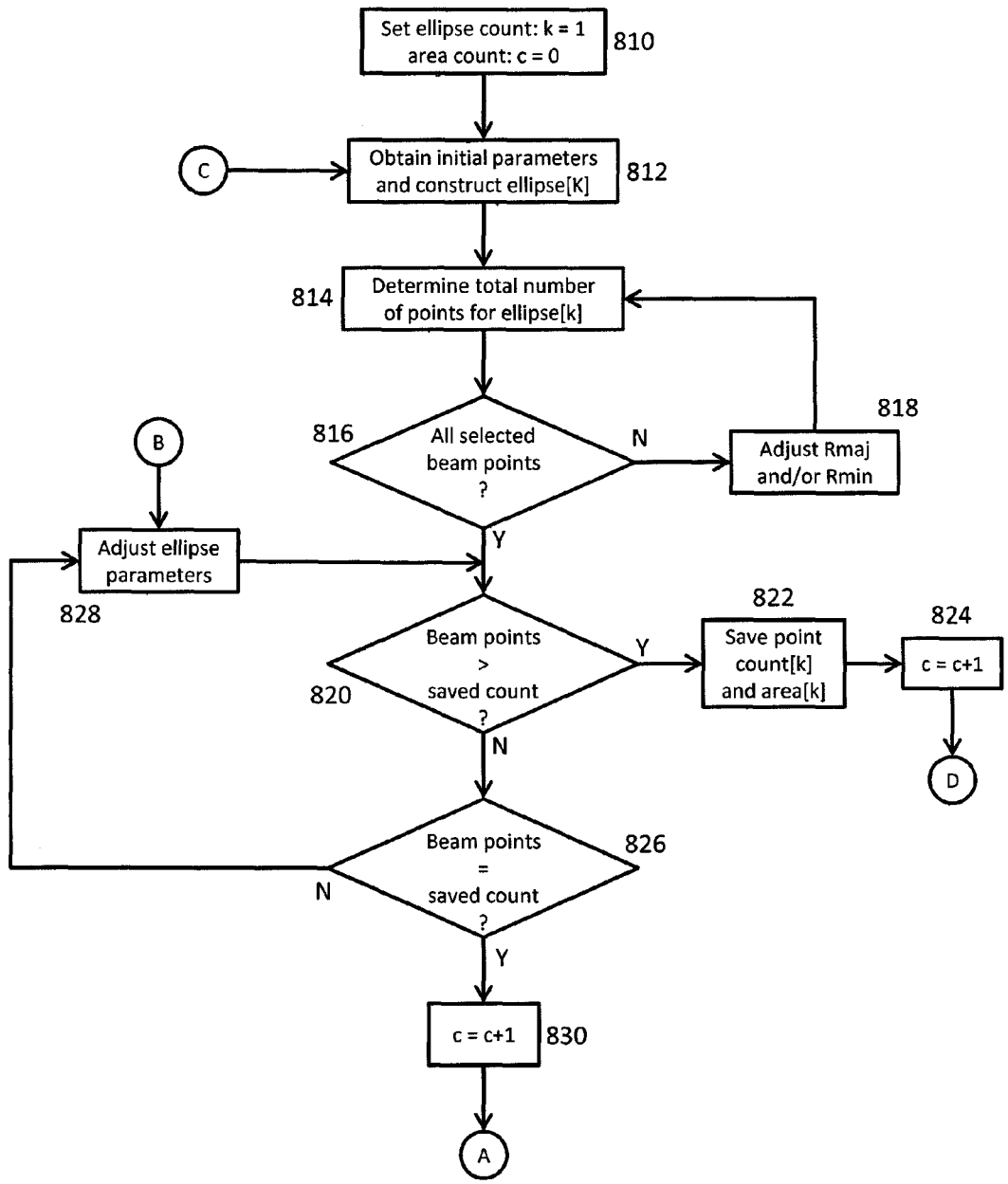
FIGS. 8A and 8B are a flowchart of a process for determining parameters for each ellipse used to define the coverage beam, according to one or more embodiments.
Figure 8B:
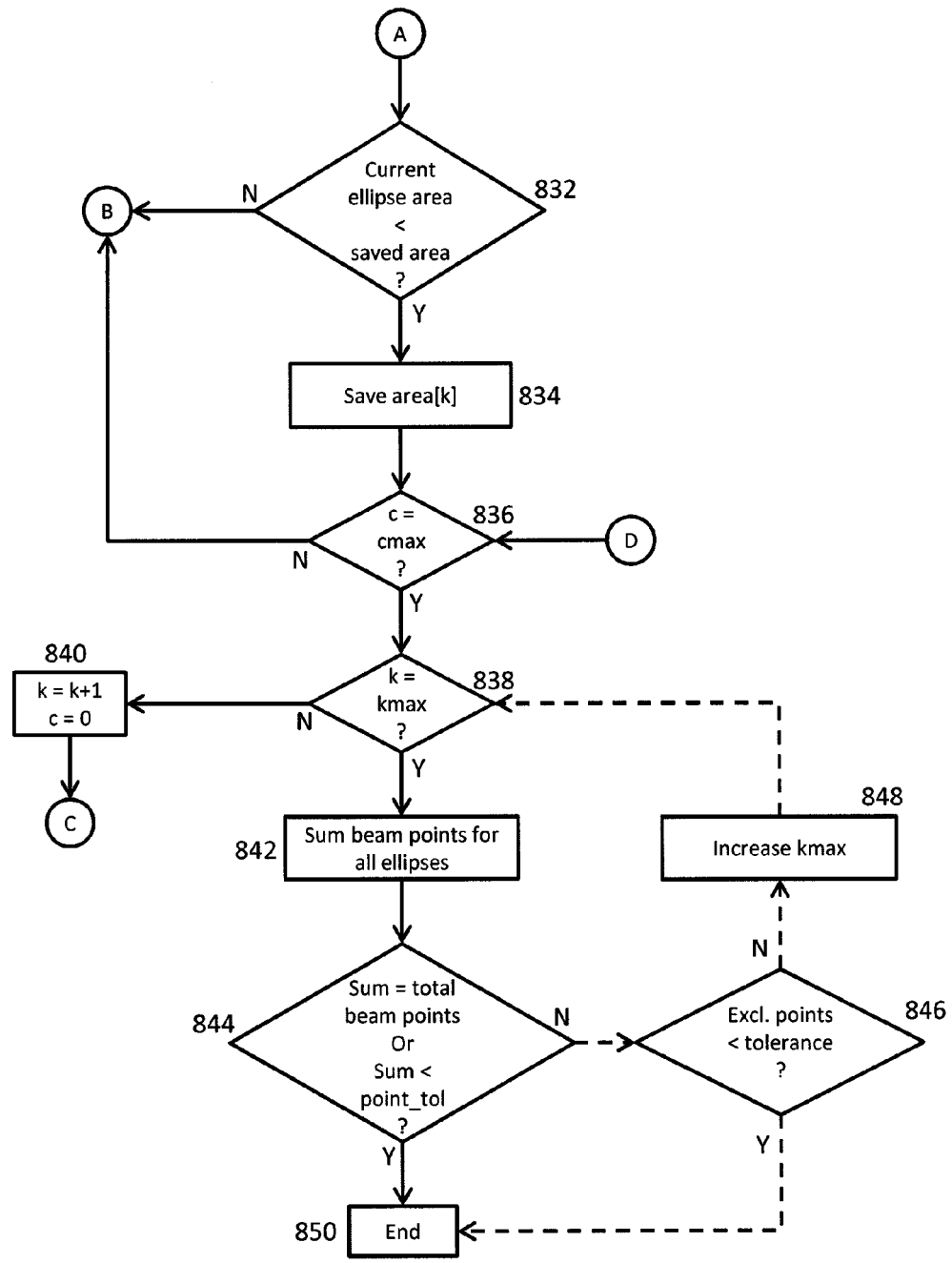

FIGS. 8A and 8B are a flowchart of a process for determining the parameters for each ellipse that is used to define the coverage beam, in accordance with at least one embodiment. At 810, an ellipse count is initialized by setting the variable k equal to one. An ellipse area count is also initialized by setting the variable c equal to zero. At 812, the initial parameters for the first ellipse (i.e., ellipse [k]) are obtained. The ellipse is also constructed with these initial parameters at 812. As previously discussed, the initial parameters can include, for example, the major radius, minor radius, center location, focal points, tilt angle, etc. More particularly, at least some of these parameters can be obtained in the manner previously discussed with respect to FIGS. 5A-5C. The ellipse center is estimated, for example, using tangents and pairs of edge points.

Depending on the specific embodiment, the ellipse can be initially constructed such that the major radius and minor radius are equal to each other, thereby resulting in a circle. The ellipse can also be constructed such that the major diameter and minor diameter are not equal to each other. Furthermore, the initial ellipse can be constructed such that it only encloses selected beam points and its size must be increased in order to enclose all (or most) of the selected beam points. The initial ellipse can also be constructed in the manner illustrated in FIG. 5A, wherein it encloses both selected beam points as well as points that should be excluded, and its size must be decreased in order to enclose only (or mostly) the selected beam points. As illustrated in FIG. 8A, the variable 'k' is used to index the current ellipse. Accordingly, once the parameters of the first ellipse have been determined and optimized, the index (k) can be increased so that parameters of subsequent ellipses can be determined and optimized until the process ends.

At 814, the total number of points within the ellipse is determined. The "total" number of points corresponds to all coordinate points, i.e., coordinate points that have been selected as beam points as well as coordinate points that have not been selected (i.e., excluded points). Embodiments such as FIG. 5A could, therefore, include both selected beam points as well as excluded beam points. Embodiments where the size of the initial ellipse must be increased, however, may include only selected beam points. Such embodiments can also include predominantly (i.e., >90%) selected beam points in situations where other parameters of the ellipse must be adjusted in order to enclose the necessary selected beam points.

At 816, an analysis is performed in order to determine whether all of the points within the ellipse are from the set of selected beam points required to be enclosed by the ellipse. As can be appreciated, the ellipse constructed using the initial parameters may not represent the optimal area for enclosing the selected beam points. Thus, the total number of coordinate points within the ellipse can include both selected beam points that must be assigned to the coverage beam as well as coordinate points (i.e., excluded points or excluded beam points) which do not need to be included within the coverage beam. If the total number of coordinate points within the ellipse includes both selected beam points and excluded coordinate points, then the major radius and the minor radius are adjusted at 818.

Referring additionally to the embodiment illustrated in FIG. 5A, for example, the adjustment would correspond to a reduction in the major radius, the minor radius, or both. According to other embodiments, however, the initial ellipse may contain only selected beam points. The analysis performed at 816 would then involve determining whether the number of selected beam points currently within the ellipse corresponds to the total number of selected beam points which must be enclosed. According to such embodiments, the adjustment at 818 can include increasing the major radius, the minor radius, or both. The amount by which the major radius and the minor radius are adjusted can vary depending on the specific implementation and/or desired level of granularity. The adjustment can also be set, for example, based on a % reduction (or % increase) of the current value, single unit of measurement (e.g., 1 meter), multiple units of measurement (e.g., 10 meters), etc. Once the major radius and minor radius have been adjusted, control returns to 814 where the total number of points within the ellipse is again determined.

If the total number of points within the ellipse is determined to be only selected beam points, then control passes to 820. A test is performed to determine whether the current number of selected beam points is greater than the previous count (or saved count). As can be appreciated, during the initial iteration, the result of this comparison will always be yes. This is to be expected because the previous count would correspond to zero since no previous record of a saved count exists. If the number of selected beam points within the ellipse is greater than the previous count, control passes to 822. The number of selected beam points within the current ellipse is saved at 822. Additionally, the area of the current ellipse is saved. As can be appreciated, the area can be calculated by various conventional methods using one or more parameters of the ellipse. At 824, the current area count (c) is incremented by one. Control then passes to 836.

If it is determined that the current number of selected beam points is not greater than the previous count (i.e., less than the previous count), control passes to 826. A test is performed to determine whether the current number of selected beam points within the ellipse is equal to the saved count. If the number of selected beam points is not equal to the saved count, control passes to 828 where one or more parameters of the ellipse are adjusted. In such conditions, the point count and area count of the ellipse are not saved. Rather, the previous values are retained.

As previously discussed, various parameters of the ellipse are adjusted at 828. The adjustable parameters can include, but are not limited to, major radius, minor radius, center coordinates, tilt angle of a major axis, translation of center about the centroid, etc. Additionally, any combination of parameters (as well as any single parameter) can be adjusted. According to one or more embodiments, for example, the major radius can be reduced until it reaches an optimized value which allows the ellipse to enclose all of the necessary selected beam points. The minor radius can be reduced in a similar fashion until the final dimensions of the ellipse represent the smallest area within which all of the selected beam points assigned to the ellipse will fit. According to another embodiment, the major radius and minor radius can be adjusted simultaneously, rather than sequentially. According to further embodiments, the coordinate location of the ellipse center can be adjusted in order to optimize the number of selected beam points within the smallest area. According to still further embodiments, the tilt angle of the ellipse relative to one or more coordinate axes can be adjusted. It should be further noted that any combination of adjustments can be performed in order to optimize the parameters of the ellipse such that the maximum number of selected beam points are enclosed by each ellipse. Once all the requisite selected beam point are enclosed, the parameters can be further optimized to reduce the area of the area of the ellipse. Thus, the foregoing examples are only intended to be illustrative, and not restrictive.

After the ellipse parameters have been adjusted, control returns to 820, where it is again determined if the current number of beam points is greater than the previous count (or saved count). According to at least one embodiment, a maximum number of parameter adjustments can be set in advance using an additional counter. The counter can be incremented at each iteration. Once the maximum number of parameter adjustments has been performed, control would pass to 826 instead of returning to 820. Alternatively, the number of parameter adjustments can be tested after 820, thus allowing control to pass to 826 without making any further adjustments to the ellipse parameters.

If the number of selected beam points is equal to the saved count (at 826), then the area count is incremented at 830. At 832, a test is performed to determine whether the area of the current ellipse is less than the saved area. If the current ellipse area is less than the saved area, then the value for the current area is saved at 834. Alternatively, if the current ellipse area is greater than the saved area, then control returns to 828 in order to further adjust parameters of the ellipse. According to various embodiments, additional constraints can be incorporated such that the number of selected beam points within the ellipse is not decreased when optimizing the ellipse area. More particularly, parameter adjustments intended to reduce the ellipse area would only be accepted if the number of selected beam points within the ellipse increases or remains the same. Parameter adjustments that reduce the number of selected beam points would, therefore, be discarded.

According to the embodiment illustrated in FIG. 8, it is possible to limit the number of adjustments made to optimize the area of the ellipse. Such a constraint can be based on desired system performance, level of granularity, etc. This is achieved, in part, by comparing the current ellipse area count (c) to a predetermined maximum at 836. For example, it may be necessary to limit the number of parameter adjustments directed to optimizing the ellipse area, for example, to 10 in order to maintain a desired level of system performance. The maximum ellipse area count (cmax)

would therefore be assigned a value of 10. Regardless of the maximum value selected, a comparison is made with the current ellipse area count at 836. If the current ellipse area count is not equal to the selected maximum value (cmax), then control passes to 828 in order to further adjust the ellipse parameters. If the current ellipse area count is equal to cmax, then no further adjustments are made. Control passes to 838.

At 838, after the ellipse parameters have been adjusted, the current ellipse count (k) is compared to the total number of ellipses (kmax). As previously discussed, various embodiments allow for setting a maximum number of ellipses to be used for enclosing the set of selected beam points. Additionally, various steps can be performed to determine the required number of ellipses, as previously discussed with respect to FIG. 5. Under such circumstances, a test can be performed at 838 in order to determine if the current ellipse count is equal to the maximum number of ellipses required or allowed. If it is determined that the current ellipse count has not reached the maximum number of ellipses, then the ellipse count is incremented at 840. The current ellipse area count is also reset to zero. Control returns to 812 where the initial parameters for the next ellipse (i.e., ellipse[k+1]) are obtained, and the optimization process is performed on the next ellipse. If it is determined, at 838, that the maximum number of ellipses has been reached, then the selected beam points contained within all of the ellipses are added together in order to obtain the total number of selected beam points for all of the ellipses. This is indicated at 842.

At 844, it is determined whether the sum of all the selected beam points enclosed by the current set of ellipses equals the total number of beam points initially selected for inclusion within the coverage beam. If the total number of selected beam points within the current set of ellipses matches the selected set of beam points, then the process ends at 844. Depending on the distribution of the selected beam points, it may not always be possible to configure the ellipses such that all the selected beam points are enclosed, while also omitting any unselected (or excluded) beam points. Various embodiments, therefore, allow the total number of selected beam points for all the ellipses to be compared to a predetermined threshold value (point_tol). According to such embodiments, the predetermined threshold value (point_tol) can be percentage of the total beam points. The percentage can vary depending on the desired system performance. For example, the threshold value can be selected between 75%-100% of the total beam points that must be enclosed by the coverage beam. Alternatively, the threshold value (point_tol) can be set independently from the total number of beam points by simply selecting a desired value, in advance, that is less than the total number of beam points.

Regardless of the manner in which the threshold value (point_tol) is selected, the sum of selected beam points for all the ellipses would be compared to point_tol at 844 instead of the total number of beam points initially selected for inclusion within the coverage beam. If the sum of selected beam points is equal to the total number of beam points initially selected (or optionally less than point_tol), then the process ends at 850. According to an embodiment, the process can be forced to end regardless of the result obtained at 844. More particularly, the desired system performance can take priority over further optimization of ellipse parameters to enclose additional selected beam points and/or reduce the area of the ellipses. Thus, once the maximum number of adjustments have been made to the ellipse parameters, the process would end so that the coverage beam can be defined without undue delays.

According to at least one embodiment, various options can be provided for dealing with situations where it is not possible to fit all of the selected beam points within the current set of ellipses without including some of the unselected (or excluded) points. According to such embodiments, a tolerance can be set as to the number of excluded points (i.e. coordinate points that should normally be excluded from the coverage beam) that may be allowed to stay within the coverage beam. For example, depending on the specific system implementation, it may be acceptable to have a certain number of excluded points within the coverage beam without adversely affecting system performance. In such embodiments, control would pass to 846 where a test can be performed to determine whether the number of excluded points is within a preset tolerance threshold. According to at least one embodiment, if the number of excluded points is not less than (i.e., exceeds) the tolerance threshold, the maximum number of ellipses (or kmax) used to define the coverage beams can be increased at 848. Control would then return to 838 where the current count is compared to the increased maximum count for the required ellipses. If the number of excluded points is below the threshold, then the process can end at 850.

According to various embodiments, each ellipse can be individually examined in order to determine whether or not excluded points have been included within its coverage area, and/or if all of the selected beam points cannot be enclosed therein. If an ellipse is found to enclose any excluded points, such an ellipse can be divided into multiple sub-ellipses in order to omit the excluded points. According to at least one embodiment, if the test result at 844 is "no", the ellipse containing excluded points would be subdivided rather than increasing the maximum number of ellipses. For example, all of the points that should be contained within such an ellipse can be re-analyzed as a new subset of selected beam points. The new subset of selected beam points can then be independently processed in the same manner described above in order to identify, for example, 2 or 3 sub-ellipses which completely enclose the subset of selected beam points while omitting all of the excluded points. These sub-ellipses can then be substituted for the initial ellipse that contained the excluded points. According to such embodiments, the contour of the coverage beam can be further improved in order to encompass only the desired number of selected beam points.

While FIG. 8 illustrates an initial adjustment only to the major and/or minor radii at 818, it should be noted that other embodiments can proceed to define and optimize the ellipse without such an initial adjustment. For example, if it is determined that all of the points within the initial ellipse are not selected beam points, control can optionally pass to 828. Various parameters of the ellipse can then be adjusted in order to optimize the number of selected beam points enclosed therein, while omitting and/or minimizing the number of excluded points. As previously discussed, the adjustable parameters include, but are not limited to, major radius, minor radius, center coordinates, tilt angle of a major axis, translation of center about the centroid, etc. Additionally, any combination of parameters (as well as any single parameter) can be adjusted. Thus, the major and minor radii can optionally be adjusted individually, or in combination, at 828.

Figure 9:
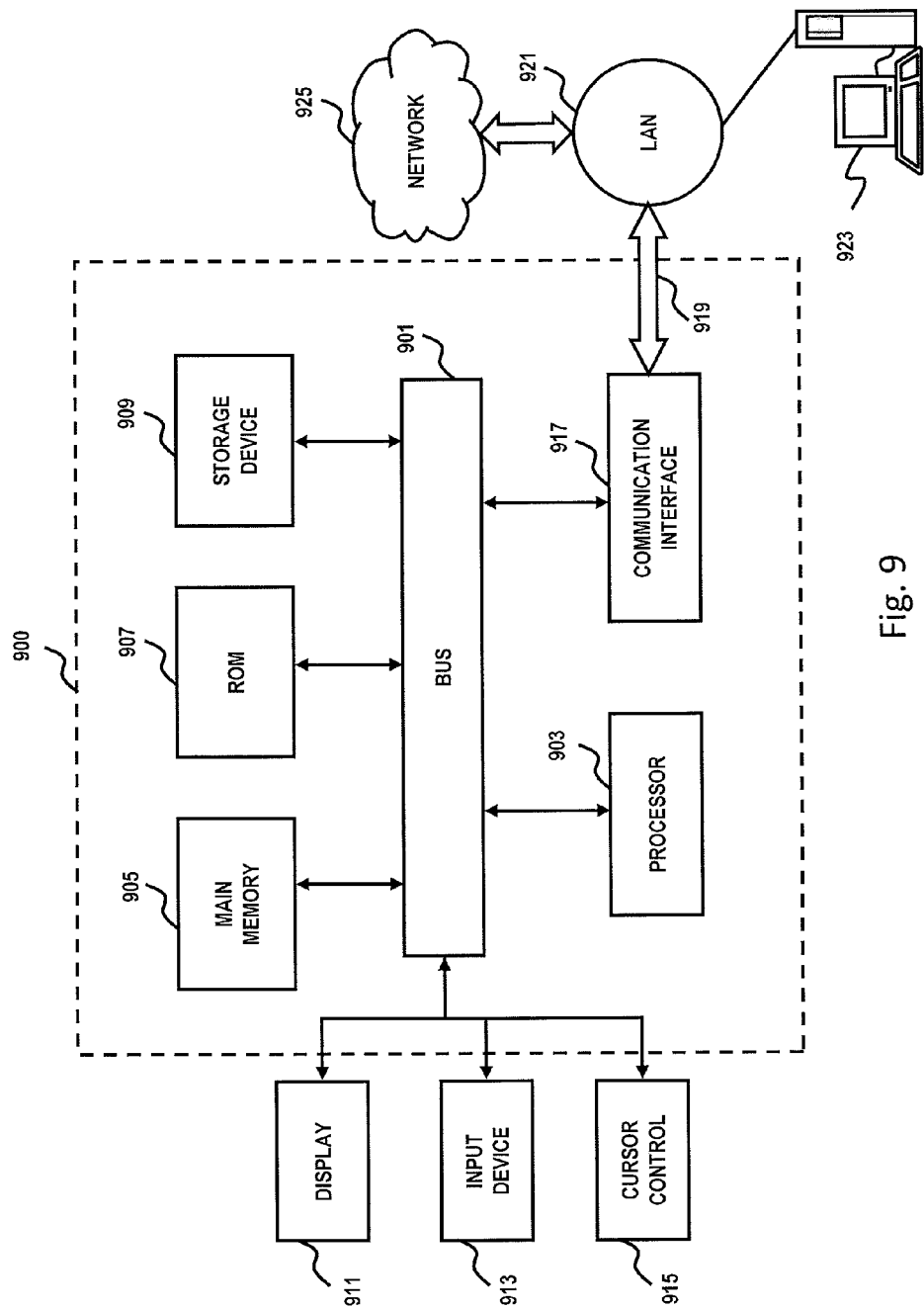
FIG. 9 is a diagram of a computer system that can be used to implement various exemplary embodiments.

FIG. 9 is a diagram of a computer system that can be used to implement various embodiments. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a light emitting diode (LED) or other flat panel displays, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911. Additionally, the display 911 can be touch enabled (i.e., capacitive or resistive) in order facilitate user input via touch or gestures.

According to an exemplary embodiment, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement exemplary embodiments. Thus, exemplary embodiments are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, or any other communication interface to provide a data communication connection to a corresponding type of communication line. As another example, communication interface 917 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a High Definition Multimedia Interface (HDMI), etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 such as a wide area network (WAN) or the Internet. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an exemplary embodiment through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Non-volatile media can further include flash drives, USB drives, microSD cards, etc. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   selecting a plurality of beam points, from a set of points on a coordinate system, to be included within a beam definition;
   determining a number of ellipses that enclose the selected beam points while excluding at least some of the remaining points from the set of points;
   assigning the selected beam points to a corresponding ellipse;
   optimizing geometric information for each ellipse to enclose the selected beam points assigned thereto; and
   defining a coverage beam for a satellite communication system based on a contour resulting from a combined shape of all the ellipses using the optimized geometric information.

2. The method of claim 1, further comprising:
adjusting parameters of one or more components of at least one transmitter contained in a communication satellite based, at least in part, on the optimized geometric information associated each ellipse; and
shaping the coverage beam of the at least one transmitter to match a combined shape of all the ellipses.

3. The method of claim 1, further comprising:
receiving the geometric information for each ellipse at a user terminal; and
selecting, by the user terminal, a coverage beam based, at least in part, on the geometric information and location information for the user terminal.

4. The method of claim 1, wherein the determining comprises:
calculating a centroid for the selected plurality of beam points; and
identifying maximum distance points (MDPs) relative to the centroid,
wherein the number of ellipses is determined based, at least in part, on the number of MDPs.

5. The method of claim 4, wherein the identifying further comprises:
calculating, for each beam point, a distance and angle from the centroid;
determining a beam outline based on beam points furthest from the centroid; and
selecting MDPs as beam points furthest away from the centroid and not approximately 180° apart from another beam point which forms part of the beam outline.

6. The method of claim 1, further comprising:
estimating a center for each ellipse; and
estimating an initial radius major and an initial radius minor for each ellipse,
wherein the selected beam points are assigned based, at least in part, on a distance to the center of each ellipse.

7. The method of claim 6, wherein the initial radius minor is equal to the initial radius major.

8. The method of claim 6, wherein the initial radius major for each ellipse is determined as a distance between the estimated center and a furthest beam point within each ellipse.

9. The method of claim 1, wherein the optimizing further comprises:
obtaining initial parameters for each ellipse;
determining a number of assigned beam points within each ellipse;
adjusting at least one of a center position, major radius, minor radius, tilt angle of a major axis, or translation of center about the centroid for each ellipse; and
repeating the determining and the adjusting if the number of assigned beam points for each respective ellipse has increased from a previous adjusting.

10. The method of claim 9, wherein at least one ellipse contains one or more excluded points, and further comprising:
determining a number of sub-ellipses that enclose the assigned beam points for the at least one ellipse while omitting the one or more excluded points within the at least one ellipse;
re-assigning the assigned beam points from the at least one ellipse into a corresponding sub-ellipse; and
optimizing geometric information for each sub-ellipse to enclose the re-assigned beam points assigned thereto, while omitting all excluded points.

11. The method of claim 9, wherein the geometric information for at least one ellipse cannot be optimized such that the ellipse encloses the selected beam points assigned thereto, while omitting all excluded points, and further comprising:
determining a number of sub-ellipses that enclose the assigned beam points for the at least one ellipse;
re-assigning the assigned beam points from the at least one ellipse into a corresponding sub-ellipse; and
optimizing geometric information for each sub-ellipse to enclose the re-assigned beam points assigned thereto, while omitting all excluded points.

12. The method of claim 2, wherein:
the adjusting comprises supplying coordinate information and geometric information of each ellipse to a beam forming unit of the communication satellite; and
the shaping comprises combining radiation of one or more elementary beams of the at least one transmitter.

13. The method of claim 12, wherein the adjusting further comprises:
modifying at least one of an amplitude and phase distribution of signals to be used in a coverage beam based, at least in part, on the coordinate information and geometric properties of each ellipse; and
applying the modified signals to a plurality of radiating elements in a feed array of the at least one transmitter to form the one or more elementary beams.

14. An apparatus comprising:
a processor configured to:
select a plurality of beam points, from a set of points on a coordinate system, to be included within a beam definition;
determine a number of ellipses that enclose the selected beam points while excluding at least some of the remaining points from the set of points;
assign the selected beam points to a corresponding ellipse;
optimize geometric information for each ellipse to enclose the selected beam points assigned thereto; and
define a coverage beam for a satellite communication system based on a contour resulting from a combined shape of all the ellipses using the optimized geometric information.

15. The apparatus of claim 14, further comprising:
at least one user terminal configured to receive the geometric information for each ellipse, and
wherein the user terminal is configured to select a coverage beam based, at least in part, on the geometric information and location information for the user terminal.

16. The apparatus of claim 14, wherein the processor is further configured to determine the number of ellipses by:
calculating a centroid for the selected plurality of beam points; and
identifying maximum distance points (MDPs) relative to the centroid,
wherein the number of ellipses is determined based, at least in part, on the number of MDPs.

17. The apparatus of claim 16, wherein the processor is further configured to identify MDPs by:
calculating, for each beam point, a distance and angle from the centroid;
determining a beam outline based on beam points furthest from the centroid; and selecting MDPs as beam points furthest away from the centroid and not approximately 180° apart from another beam point which forms part of the beam outline.

18. The apparatus of claim 14, wherein the processor is further configured to:
estimate a center for each ellipse; and
estimate an initial radius major and an initial radius minor for each ellipse,
wherein the selected beam points are assigned based, at least in part, on a distance to the center of each ellipse.

19. The apparatus of claim 18, wherein the initial radius minor is equal to the initial radius major.

20. The apparatus of claim 18, wherein the initial radius major for each ellipse is determined as a distance between the estimated center and a furthest beam point within each ellipse.

21. The apparatus of claim 14, wherein the processor is further configured to:
generate initial parameters for each ellipse;
determine a number of assigned beam points within each ellipse;
adjust at least one of a center position, major radius, minor radius, tilt angle of a major axis, or translation of center about the centroid for each ellipse; and
repeat the determine and the adjust if the number of assigned beam points for each respective ellipse has increased from a previous adjustment.

22. The apparatus of claim 21, wherein at least one ellipse contains one or more excluded points, and wherein the processor is further configured to:
determine a number of sub-ellipses that enclose the assigned beam points for the at least one ellipse while omitting the one or more excluded points within the at least one ellipse;
re-assign the assigned beam points from the at least one ellipse into a corresponding sub-ellipse; and
optimize geometric information for each sub-ellipse to enclose the re-assigned beam points assigned thereto, while omitting all excluded points.

23. The apparatus of claim 21, wherein the geometric information for at least one ellipse cannot be optimized such that the ellipse encloses the selected beam points assigned thereto, while omitting all excluded points, and wherein the processor is further configured to:
determine a number of sub-ellipses that enclose the assigned beam points for the at least one ellipse;
re-assign the assigned beam points from the at least one ellipse into a corresponding sub-ellipse; and
optimize geometric information for each sub-ellipse to enclose the re-assigned beam points assigned thereto, while omitting all excluded points.

24. The apparatus of claim 14, further comprising:
a communication satellite including at least one transmitter,
wherein the communication satellite is configured to adjust parameters of one or more components of at least one transmitter, at least in part, on the optimized geometric information associated each ellipse, and
wherein the at least one transmitter generates the coverage beam to have a shape which matches a combined shape of all the ellipses.

25. The apparatus of claim 24, further comprising:
a beam forming unit disposed within the communication satellite,
wherein the communication satellite is further configured to adjust the parameters by supplying coordinate information and geometric properties of each ellipse to the beam forming unit, and
wherein the shape of the coverage beam is achieved through combined radiation of one or more elementary beams by the at least one transmitter.

26. The apparatus of claim 24, wherein the communication satellite is further configured to adjust parameters of the one or more components by:
modifying at least one of an amplitude and phase distribution of signals to be used in the coverage beam based, at least in part, on the coordinate information and geometric properties of each ellipse; and
applying the modified signals to a plurality of radiating elements in a feed array to form the one or more elementary beams.

* * * * *